United States Patent
Kotlarski

(10) Patent No.: US 6,672,814 B1
(45) Date of Patent: Jan. 6, 2004

(54) STRUCTURAL UNIT CONSISTING OF A HOLDING ELEMENT AND A WINDSCREEN-WIPING DEVICE

(75) Inventor: Thomas Kotlarski, Ceské Budejovice (CZ)

(73) Assignee: Robert Bosch GmbH, Stuttgart (DE)

( * ) Notice: Subject to any disclaimer, the term of this patent is extended or adjusted under 35 U.S.C. 154(b) by 36 days.

(21) Appl. No.: 09/868,456

(22) PCT Filed: Oct. 17, 2000

(86) PCT No.: PCT/DE00/03635

§ 371 (c)(1),
(2), (4) Date: Aug. 9, 2001

(87) PCT Pub. No.: WO01/28824

PCT Pub. Date: Apr. 26, 2001

(30) Foreign Application Priority Data

Oct. 19, 1999 (DE) .......................................... 199 50 214

(51) Int. Cl.⁷ .................................................. B60S 1/04
(52) U.S. Cl. ....................... 411/527; 411/521; 411/525; 411/526; 15/250.31
(58) Field of Search .......................... 403/315–17, 326, 403/327, 329; 411/525, 526, 527, 521; 15/250.31

(56) References Cited

U.S. PATENT DOCUMENTS

| 1,547,628 | A | * | 7/1925 | Tinneman | 126/190 |
|---|---|---|---|---|---|
| 1,849,604 | A | * | 3/1932 | Watherhead, Jr. | 411/352 |
| 1,928,469 | A | * | 9/1933 | Tinnerman | 411/527 |
| 2,281,056 | A | * | 4/1942 | Tinnerman | 411/198 |
| 2,344,570 | A | * | 3/1944 | Tinnerman | 411/525 |
| 2,482,614 | A | * | 9/1949 | Flora | 403/199 |
| 2,615,362 | A | * | 10/1952 | Churchman | 411/527 |
| 2,867,142 | A | * | 1/1959 | Hutchins | 29/270 |
| 3,182,939 | A | * | 5/1965 | Seckerson | 248/73 |
| 4,664,465 | A | * | 5/1987 | Johnson et al. | 339/119 L |
| 4,784,418 | A | * | 11/1988 | Pearson et al. | 292/348 |
| 6,238,094 | B1 | * | 5/2001 | Scabanel et al. | 384/296 |

FOREIGN PATENT DOCUMENTS

| DE | 197 39 842 A | 3/1999 |
|---|---|---|
| EP | 0 685 657 A | 12/1995 |
| EP | 0 798 183 A | 10/1997 |
| FR | 2 770 880 A | 5/1999 |

* cited by examiner

*Primary Examiner*—Lynne H. Browne
*Assistant Examiner*—G M Collins
(74) *Attorney, Agent, or Firm*—Michael J. Striker

(57) ABSTRACT

The structural unit (12) is comprised of a securing element (11) and a wiper device (10) and the wiper device 10 is detachably fastened to the securing element (11). In this instance, the detachable connection is embodied as a detent connection. A detent element (14) is embodied on the securing element (11) and elastically engages in detent fashion in a detent seat (13) embodied on a wiper bearing (15) of the wiper device (10).

7 Claims, 3 Drawing Sheets

STRUCTURAL UNIT CONSISTING OF A HOLDING ELEMENT AND A WINDSCREEN-WIPING DEVICE

The invention relates to a structural unit comprised of a securing element and a wiper device, in which the wiper device is detachably fastened to the securing element, according to the preamble to claim 1.

PRIOR ART

Known structural units comprised of a securing element and a wiper device of a vehicle are complex and not user-friendly friendly in terms of their structural design and their ability to be used. This leads to a time-consuming installation or connection of a wiper device to the securing element of a vehicle, possibly with the additional use of installation and/or fastening aids.

ADVANTAGES OF THE INVENTION

The structural unit according to the invention, according to the preamble to claim 1, is characterized in that the detachable connection is embodied as a detent connection. A structural unit embodied in this way is particularly easy to use since with correct positioning of the wiper device in relation to the securing element, an automatically produced detent connection is obtained, by means of which the wiper device is secured in the securing element. Thanks to the automatically produced detent connection, expensive installation and/or fastening aids are not needed to attach the wiper device to the securing element. A detent connection can also reduce the number of structural elements of the structural unit to a minimum so that the structural unit can also be embodied relatively simply in terms of its structural design.

Advantageously, a detent element is embodied on the securing element and elastically engages in detent fashion in a detent seat embodied on a wiper bearing of the wiper device. Since the wiper bearing usually includes a pin-shaped shaped portion and the securing element is normally embodied as a relatively thin-walled plate, it is advantageous for structural and technical operation-related reasons to provide a detent element on the securing element and to equip the wiper bearing with a suitably embodied detent seat.

According to a preferred embodiment, the detent seat is embodied as a circumferential groove which describes a circle that is closed in the longitudinal direction. Embodying the detent seat as a circumferential groove extending in a circle is particularly advantageous for a detent connection since the detent element of the securing element can engage in detent fashion at any point along the circumferential groove. This particularly simplifies the installation of the wiper device onto the securing element since the detent seat of the wiper bearing does not have to be aligned in a particular way in relation to the detent element; it is instead sufficient to merely position the circumferential groove in the plane of the detent element in order to trigger the automatic detent action. The detent element can execute the detent action at any point of the circumferential groove.

Advantageously, the detent element has at least one elastically mobile spring element which has a detent edge which is geometrically fitted to the circumferential groove. Consequently, after production of the detent connection, the spring element extends along at least a part of the circumference of the circumferential groove. Using an elastically mobile spring element, which is geometrically fitted to the circumferential groove, as a detent element is particularly suited for assuring an automatically produced, reliable detent connection when there is a corresponding reciprocal positioning of the detent element and the detent seat. In addition, a detent element embodied in this way is relatively easy to manufacture in terms of production engineering.

According to a preferred embodiment, the securing element is embodied as a securing plate and the spring element is comprised of two elastically mobile, opposing sheet metal parts of the securing plate. A securing element embodied as a securing plate is particularly suitable for producing a detent connection with a wiper bearing that has a detent seat. In order to obtain a reliable and preferably force-symmetrical detent connection between the securing element and the wiper device, the provision is made to produce two opposing, elastically mobile sheet metal parts in the securing plate which, when the wiper bearing of the wiper device is suitably positioned, simultaneously engage in detent fashion in the circumferential groove and secure the wiper bearing and/or the wiper device in a definite rest position.

When in their detent position, the sheet metal parts advantageously protrude from a common plane of the securing plate. With the positioning of the circumferential groove in relation to the spring element, the sheet metal parts are automatically brought into the desired detent position by means of the wiper bearing, which is to be slid partially through the securing plate. Consequently, a particular detent position of the securing plate does not have to be previously produced in order to obtain a reliable and secure detent connection, but rather, the correct detent position of the sheet metal parts is produced automatically by the wiper bearing which, during installation of the wiper device on the securing element, penetrates the securing plate in the vicinity of the structural unit, i.e. between the opposing, elastically mobile sheet metal parts. Consequently, no special installation and/or fastening aids or special installation pre-adjustments of the sheet metal parts are required.

Preferably, the detent edges of the sheet metal parts are essentially oriented toward each other in their detent position. This assures a correct, definite, and reliable detent engagement of the detent edges of the sheet metal parts in the circumferential groove of the wiper bearing. The term "detent edges" is understood to mean the region which automatically protrudes into the circumferential groove in the detent position due to the operative elastic restoring force. In this region, the sheet metal parts have a preferably constant wall thickness and produce a form-fitting connection with the circumferential groove. The form-fitting connection between the detent edges of the sheet metal parts and the circumferential groove can be embodied in such a way that after the production of the detent connection and when the sheet metal parts are elastically pivoted out of their detent position, there is an elastic and/or plastic deformation of the detent edges of the sheet metal parts or the walls of the circumferential groove.

According to a preferred embodiment, the respective end surfaces of the detent edges remain in contact with a bottom surface of the circumferential groove in the detent position of the sheet metal parts. The contact of the respective end surfaces of the sheet metal parts with the bottom surface of the circumferential groove in the detent position assures that the sheet metal parts are detent connected to the wiper bearing so that there is no play at least in the depth direction of the circumferential groove or at least in a partial section of the circumference of the circumferential groove. Since the sheet metal parts are disposed opposite each other and are elastically mobile, such a lack of play can be obtained relatively easily in such a way that before assuming their detent position, the sheet metal parts are moved by the wiper bearing counter to an elastic restoring force. This elastic restoring force automatically guides the sheet metal parts into their detent positions and in the detent position, brings the respective end surfaces of the detent edges of the sheet metal parts at least partially into contact with the bottom surface of the circumferential groove.

Advantageously, the sheet metal part can be elastically moved in opposite directions around a pivot axis disposed in the common plane of the securing element. Because of the elastic mobility of the respective sheet metal parts in opposite directions, on the one hand it is possible to obtain an automatically produced detent connection between the respective sheet metal part and the circumferential groove because of the elastic restoring force produced and on the other hand, after the production of the detent connection, an elastic pivoting to a certain degree of the respective sheet metal parts in opposite directions, i.e. toward the plane of the securing plate and away from this plane. Such an elastic flexibility of the securing elements after the production of the detent connection can on the one hand be advantageous with regard to the installation/removal of the wiper device onto/from the securing plate and on the other hand, through suitable structural measures and/or exploitation of specific material properties of the structural parts, it is possible to precisely determine the inward pressing force, which the sheet metal parts exert during installation in order to produce the detent connection with the wiper bearing, and the outward pressing force, which must be exerted during removal of the wiper bearing from the securing plate in order to release the detent connection. Based on such an adjustability of the outward pressing force that must be exerted to release the detent connection, by means of which the sheet metal parts slide out of the circumferential groove, possibly producing a plastic deformation of the sheet metal parts and/or of the circumferential groove, it is also possible to fulfill particular safety requirements such as the requirement that the wiper device be sufficiently flexible and/or release in the event of a collision, particularly when colliding with a human body. In this connection, the outward pressing force that must be exerted to release the detent connection and consequently to release the wiper device, and also the inward pressing force (elastic restoring force) that must be surmounted in order to produce the detent connection can be predetermined by one or more parameters, such as the groove depth of the circumferential groove, or the wall thickness, length, and/or form of the sheet metal parts.

Preferably, in the detent position of the sheet metal parts, the detent edges completely encompass the circumferential groove. This permits a rapid and reliable detent connection to be obtained in a detent region that is as large as possible. If a number of sheet metal parts are provided, which are disposed opposite one another or next to one another and protrude from the plane of the securing plate in the detent position, this produces a particularly stable detent connection since in the detent position, the sheet metal parts are connected to one another and if there is a forced movement in the direction of the plane, the sheet metal parts are subjected to a compressive strain that causes an elastic compression of the sheet metal parts and possibly an additional plastic deformation of the circumferential groove. In the event of such a forced movement in the direction toward the plane, this compressive strain would be produced not only among the sheet metal parts, but also between the circumferential groove and each respective sheet metal part.

According to an alternative embodiment, the wiper device is attached to the securing element of the vehicle by means of a respective detent connections at a number of fastening points that are spaced apart from one another, preferably three of them. The production of the detent connection does not absolutely or exclusively have to be produced at the wiper bearing; additional pin-shaped, preferably cylindrical connecting elements can instead be provided on the wiper device, each with a respective detent seat. The detent connection and/or the structural elements required for it, in particular the detent seat and the associated detent element, can also be adapted to the particular application in terms of their function and their spatial disposition.

Advantageously, the sheet metal parts can be elastically pivoted out of their detent position around their pivot axes, into a direction away from the plane, and when correspondingly pivoted toward the plane, can be subjected to a plastic deformation due to a compressive force produced among the sheet metal parts and/or between each respective sheet metal part and the circumferential groove of the wiper bearing. Due to the plastic deformation of the sheet metal parts and/or the circumferential groove being produced in one movement direction, a relatively stable detent connection is produced between the sheet metal parts and the circumferential groove. Due to a suitable adjustment and/or setting of the compressive force producing the plastic deformation, a desired releasing of the detent connection counter to the plastic deformation forces being produced can be simultaneously achieved.

Preferably, the structural unit for fastening the wiper device to the securing element has an additional fastening device after the production of the detent connection. The detent connection permits a rapid and particularly effective preassembly of the wiper device to the securing element so that if needed, an additional connection, for example by means of a screw connection, can then be produced with particular ease. In this instance, the structural unit thus serves to correctly position and secure the wiper device to the securing element, while a screw connection produces a particularly stable attachment of the wiper device to the securing element.

Other advantageous embodiments of the invention ensue from the characteristics mentioned in the description.

DRAWINGS

An exemplary embodiment of the invention will be explained in detail below in conjunction with the accompanying drawings.

DESCRIPTION OF THE EXEMPLARY EMBODIMENTS

Figure 1:
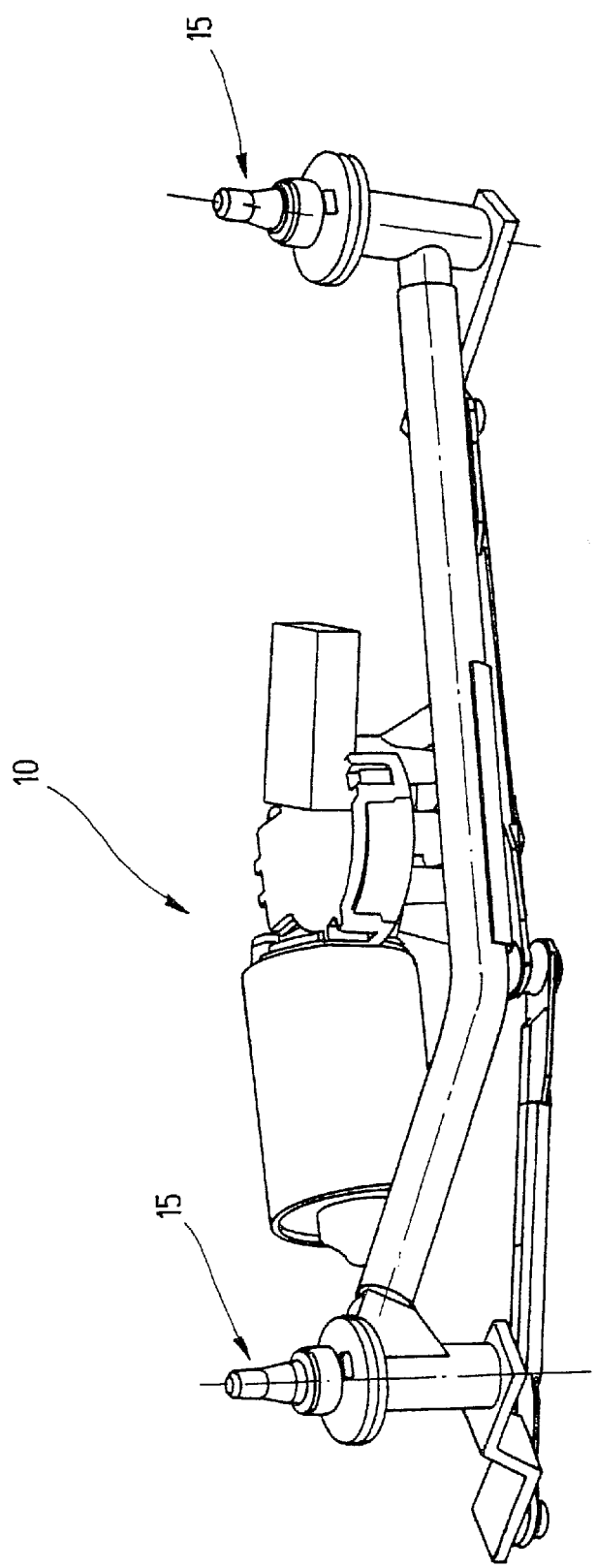
FIG. 1 shows a schematic, perspective view of a partially depicted wiper device.

FIG. 1 shows a part of a wiper device, which is labeled as a whole with the reference numeral 10. The wiper device 10 includes two wiper bearings 15, which are embodied in such a way that they permit the wiper device 10 to be fastened to a vehicle (not shown).

Figure 2:
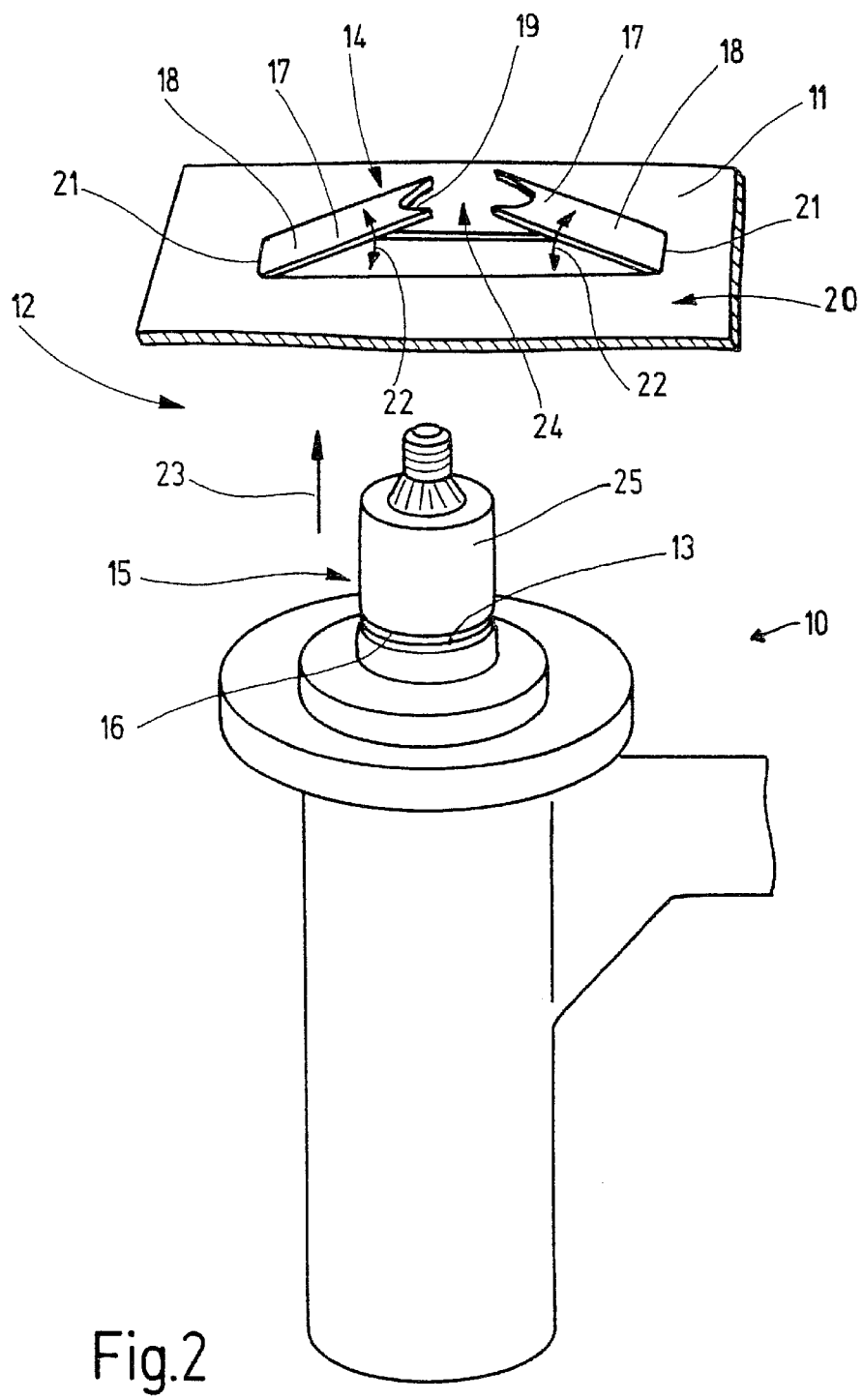
FIG. 2 shows a schematic, perspective view of a structural unit according to the invention, in an enlarged scale.

As shown in FIG. 2, the wiper device 10 is attached to a securing element 11 of the vehicle (not shown), which is embodied as a securing plate. In this instance, the securing element 11 and the wiper bearing 15 of the wiper device 10 are embodied in such a way that they combine to constitute a structural unit 12. The structural unit 12 has a detent seat 13 and a detent element 14 for producing a detent connection between the wiper device 10 and the securing element 11. According to the exemplary embodiment shown, the detent element 14 is embodied on the securing element 11 and can elastically engage in detent fashion in the detent seat 13 of the wiper bearing 15 of the wiper device 10. However, is also conceivable that according to an embodiment that is not shown, the wiper device 10 has the detent element which can engage in detent fashion in a suitably embodied detent seat of the securing element.

The detent seat 13 is constituted by a circumferential groove 16 on a cylindrical pin 25 of the wiper bearing 15; this groove describes a circle that is closed in the longitudinal direction. The detent element 14 is embodied as an elastically mobile spring element 17 which has a detent edge 19 that is geometrically fitted to the circumferential groove 16. The spring element 17 is preferably comprised of two elastically mobile, opposing sheet metal parts 18 of the securing plate, where in their detent position, the sheet metal parts 18 protrude from a plane 20 of the securing plate in such a way that the two opposing detent edges 19 of the two sheet metal parts 18 constitute a through opening 24. When the sheet metal parts 18 are disposed in the rest position, the through opening 24 is smaller in diameter then the outer diameter of the cylindrical pin 25 of the wiper bearing 15. The sheet metal parts 18 can be elastically moved around a pivot axis 21 disposed in the plane 20 of the securing element 11, in opposite directions according to the arrow 22, i.e. toward the plane 20 and away from the plane 20.

If the wiper bearing 15 is slid with its cylindrical pin 25 through the through opening 24 between the two sheet metal parts 18, in the direction of an arrow labeled 23, then the pin 25 first pivots the two sheet metal parts 18 elastically outward, i.e. around their pivot axis 21 in the direction away from the plane 20 according to the arrow 23, until the detent edges 19 of the sheet metal parts 18 rest against the cylindrical outer surface of the pin 25 and glide along its outer surface when the pin 25 is moved. The wiper bearing 15 that is moved in the direction of the arrow 23 is slid with its cylindrical pin 25 through the through opening 24 until the pin 25 has reached a detent position in which the detent edges 19 of the sheet metal parts 18 automatically engage in detent fashion in the circumferential groove 16 due to the operative elastic restoring forces. After the production of the detent connection between the securing element 11 (sheet metal parts 18) and the wiper device 10 (pin 25), the wiper device 10 is secured by the securing plate of the vehicle.

Figure 3:
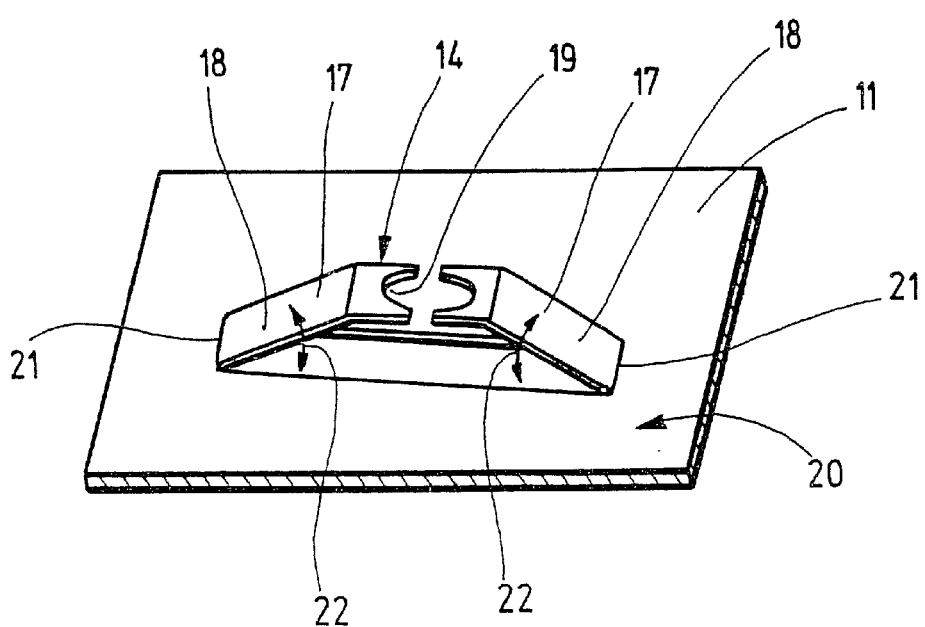
FIG. 3 shows a schematic, perspective representation of an alternative embodiment of a securing element of the structural unit according to the invention.

According to an alternative embodiment according to FIG. 3, the detent edges 19 of the sheet metal parts 18 are essentially oriented toward each other in their detent position. This embodiment makes it possible for the respective end surfaces (not shown) of the detent edges 19 to at least partially contact a bottom surface of circumference groove 16 in the detent position of the sheet metal parts 18. As a result, in the detent position of the sheet metal parts 18, the detent edges 19 can combine to completely encompass the circumferential groove 16 and/or after the production of the detent connection, can extend along at least a part of the circumference of the circumferential groove 16. In both instances, the sheet metal parts 18 can be elastically pivoted to a certain degree out of their detent position, around their pivot axes 21 in a direction away from the plane 20. With a greater pivoting around their pivot axes 21 in the direction toward the plane 20, the sheet metal parts 18 are subjected to a plastic deformation due to a compressive force occurring between the respective sheet metal part 18 and the circumferential groove 16 of the wiper bearing 15. For the case in which the sheet metal parts 18 are already in contact with one another in the detent position, i.e. when the sheet metal parts 18 combine to completely encompass the circumferential groove 16, with a greater pivoting of the sheet metal parts 18 around their pivot axes 21 in the direction toward the plane 20, there is a plastic deformation (compression) of the sheet metal parts 18 due to compressive force acting between them.

Instead of producing a detent connection between the cylindrical pin 25 of the wiper bearing 15 and the securing element 11 and/or the sheet metal parts 18, it is also possible to produce a corresponding connection with other pins (not shown) provided on the wiper device 10. In an embodiment of this kind with a number of pins for producing a detent connection with the securing plate, preferably three pins, which are disposed in a triangle and are sufficiently spaced apart from one another, can be provided for connecting the wiper device 10 to the securing plate by means of a detent connection. It is also possible that after the production of the detent connection, the structural unit 12 for fastening the wiper device 10 to the securing element 11 has an additional fastening device (not shown), e.g. a screw connection, between the wiper device 10 and the securing element 11. Advantageously, the inward pressing force, which acts in the direction of the arrow 23 and is produced during positioning of the wiper bearing 15, and the outward pressing force, which acts in the opposite direction from the arrow 23 and is required to release the detent connection, can be predetermined and/or adapted to the respective existing conditions by means of one or more parameters, such as the groove depth of the circumferential groove 16, or the wall thickness, length, and/or form of the sheet metal parts 18.

The spring element 17 can be made of metal or another suitable material.

The structural unit 12 is particularly advantageous in a collision, for example with a human body, since in a situation of this kind, the structural unit 12 flexes elastically and/or, depending on the magnitude of the collision force acting externally on the structural unit 12, the wiper device 10 completely releases and consequently completely or at least partially prevents dangerous injuries to the human body colliding with the wiper device 10. The structural unit 12 is consequently suited to effectively and relatively simply fulfill particular safety requirements with regard to maximal protection of pedestrians. An advantageous effect of this kind, however, can only be produced if the detachable connection of the wiper device 10 to the securing element 11 is embodied exclusively as a detent connection and no additional connection device, e.g. in the form of a screw connection between the wiper device 10 and the securing element 11, is provided.

What is claimed is:

1. A structural unit comprised of a securing element and a wiper device, in which the wiper device is detachably fastened to the securing element, wherein the detachable connection is embodied as a detent connection, wherein the detent connection (14) is embodied on the securing element (11) and elastically engages in a detent fashion in a detent seat (13) on a wiper bearing (15) of the wiper device (10), wherein the detent seat (13) is a circumferential groove (16), wherein said circumferential groove (16) describes a circle that is closed in a longitudinal direction, said detent connection (14) having at least one elastically mobile spring element (17), wherein said at least one spring element (17) has at least one detent edge (19) that is geometrically fitted to the circumferential groove (16), wherein the securing element (11) is a securing plate and the at least one spring element (17) is comprised of two elastically mobile opposing sheet metal parts (18) of the securing plate, wherein said at least one detent edge of said sheet metal parts (18) are substantially oriented toward each other in a detent position, wherein in said detent position of the two elastically mobile opposing sheet metal parts (18), respective end surfaces of the at least one detent edge (19) contact a bottom surface of the circumferential groove (16) and completely encompass the circumferential groove (16), and wherein at least one parameter selected from the group consisting of a depth of said circumferential groove (16), a wall thickness of said sheet metal parts, a length of said sheet metal parts, and a form of said sheet metal parts is selected to adjust an outward pressing force that must be exerted to release the detent connection (14) and thereby the wiper device with possible plastic deformation of an element selected from the group consisting of said sheet metal parts, said circumferential groove and both said metal parts and said circumferential groove, such that a safety requirement is fulfilled that said wiper device be sufficiently flexible and/or released in the event of a collision when colliding with a human body.

2. The structural unit according to claim 1, characterized in that in their detent position, the sheet metal parts (18) protrude from a plane (20) of the securing plate.

3. The structural unit according to claim 1, characterized in that the wiper device (10) is mounted to the securing element (11) of the vehicle by means of a respective detent connection at three fastening points that are spaced apart from one another.

4. The structural unit according to claim 1, characterized in that the sheet metal parts (18) can be pivoted elastically out of the detent position, around a pivot axis of each said sheet metal parts, in a direction away from a plane (20) of the securing element and with a corresponding pivoting toward the plane (20), are subjected to a plastic deformation due to a compressive force produced among the sheet metal parts (18) and/or between each respective sheet metal part (18) and the circumferential groove (16) of the wiper bearing (15).

5. The structural unit according to claim 1, characterized in that the structural unit (12) for attaching the wiper device (10) to the securing element (11) has an additional fastening device after the production of the detent connection.

6. A structural unit comprised of a securing element and a wiper device, in which the wiper device is detachably fastened to the securing element, wherein the detachable connection is embodied as a detent connection, wherein the detent connection (14) is embodied on the securing element (11) and elastically engages in a detent fashion in a detent seat (13) on a wiper bearing (15) of the wiper device (10), wherein the detent seat (13) is a circumferential groove (16) on a cylindrical pin (25), wherein said circumferential groove (16) describes a circle that is closed in a longitudinal direction, said detent connection (14) having at least one elastically mobile spring element (17), wherein said at least one spring element (17) has at least one detent edge (19) that is geometrically fitted to the circumferential groove (16), wherein the securing element (11) is a securing plate and the at least one spring element (17) is comprised of two elastically mobile opposing sheet metal parts (18) of the securing plate, wherein said at least one detent edge of said sheet metal parts (18) are substantially oriented toward each other in a detent position, and wherein in said detent position of the two elastically mobile opposing sheet metal parts (18), respective end surfaces of the at least one detent edge (19) contact a bottom surface of the circumferential groove (16), the end surfaces of the detent edges (19) of the sheet metal parts (18) are circumferential surfaces corresponding to the circumferential groove (16) of the detent seat (13) to extend along at least a part of the circumferential grooves (16) in a continuous contact therewith, and wherein at least one parameter selected from the group consisting of a depth of said circumferential groove (16), a wall thickness of said sheet metal parts, a length of said sheet metal parts, and a form of said sheet metal parts is selected to adjust an outward pressing force that must be exerted to release the detent connection (14) and thereby the wiper device with possible plastic deformation of an element selected from the group consisting of said sheet metal parts, said circumferential groove and both said metal parts and said circumferential groove, such that a safety requirement is fulfilled that said wiper device be sufficiently flexible and/or released in the event of a collision when colliding with a human body, wherein the detent edges (19) are circular and together form a through opening (24) with a diameter which is smaller than an outer diameter of said cylindrical pin (25) in a rest position, but in the detent position the diameter of the through opening (24) reduces for providing automatic engagement of the detent edges (19) into the circumferential groove (16) due to elastic restoring forces.

7. A structural unit comprised of a securing element and a wiper device, in which the wiper device is detachably fastened to the securing element, wherein the detachable connection is embodied as a detent connection, wherein the detent connection (14) is embodied on the securing element (11) and elastically engages in a detent fashion in a detent seat (13) on a wiper bearing (15) of the wiper device (10), wherein the detent seat (13) is a circumferential groove (16), wherein said circumferential groove (16) describes a circle that is closed in a longitudinal direction, said detent connection (14) having at least one elastically mobile spring element (17), wherein said at least one spring element (17) has at least one detent edge (19) that is geometrically fitted to the circumferential groove (16), wherein the securing element (11) is a securing plate and the at least one spring element (17) is comprised of two elastically mobile opposing sheet metal parts (18) of the securing plate, wherein said at least one detent edge of said sheet metal parts (18) are substantially oriented toward each other in a detent position, and wherein in said detent position of the two elastically mobile opposing sheet metal parts (18), respective end surfaces of the at least one detent edge (19) contact a bottom surface of the circumferential groove (16), and the end surfaces of the detent edges (19) of the sheet metal parts (18) are circumferential surfaces corresponding to the circumferential groove (16) of the detent seat (13) to extend along at least a part of the circumferential grooves (16) in a continuous contact therewith and completely encompass the circumferential groove, and wherein at least one parameter selected from the group consisting of a depth of said circumferential groove (16), a wall thickness of said sheet metal parts, a length of said sheet metal parts, and a form of said sheet metal parts is selected to adjust an outward pressing force that must be exerted to release the detent connection (14) and thereby the wiper device with possible plastic deformation of an element selected from the group consisting of said sheet metal parts, said circumferential groove and both said metal parts and said circumferential groove, such that a safety requirement is fulfilled that said wiper device be sufficienty flexible and/or released in the event of a collision when colliding with a human body.

* * * * *